US012060012B2

(12) United States Patent
Carlson

(10) Patent No.: US 12,060,012 B2
(45) Date of Patent: Aug. 13, 2024

(54) MODERATION OF A DRIVER ASSIST CAMERA ENVIRONMENT BY HEADLINER AIR DUCT

(71) Applicant: ZF ACTIVE SAFETY AND ELECTRONICS US LLC, Livonia, MI (US)

(72) Inventor: Daniel D. Carlson, Livonia, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 1816 days.

(21) Appl. No.: 15/312,690

(22) PCT Filed: Jun. 9, 2015

(86) PCT No.: PCT/US2015/034803
§ 371 (c)(1),
(2) Date: Nov. 21, 2016

(87) PCT Pub. No.: WO2015/191512
PCT Pub. Date: Dec. 17, 2015

(65) Prior Publication Data
US 2017/0182952 A1 Jun. 29, 2017

Related U.S. Application Data

(60) Provisional application No. 62/010,695, filed on Jun. 11, 2014.

(51) Int. Cl.
*G03B 29/00* (2021.01)
*B60J 1/00* (2006.01)
(Continued)

(52) U.S. Cl.
CPC ............... *B60R 11/04* (2013.01); *B60J 1/002* (2013.01); *B60S 1/026* (2013.01);
(Continued)

(58) Field of Classification Search
CPC ........... B60R 11/04; B60R 1/12; B60R 11/00; B60R 1/00; B60R 2011/0026;
(Continued)

(56) References Cited

U.S. PATENT DOCUMENTS 4,867,561 A * 9/1989 Fujii .................. B60H 1/00785
356/239.8
4,984,089 A * 1/1991 Stiepel ................... G03B 17/08
165/48.1
(Continued)

FOREIGN PATENT DOCUMENTS

EP 2474449 1/2012
JP 2007015457 A 1/2007

OTHER PUBLICATIONS

PCT/US2015/034803 International Search Report and Written Opinion, completed Aug. 5, 2015.

*Primary Examiner* — Patrick E Demosky
(74) *Attorney, Agent, or Firm* — Tarolli, Sundheim, Covell & Tummino LLP

(57) ABSTRACT

A system for moderating the environment of a driver assist camera of a vehicle having a camera mounted within a housing adapted to be attached to a window and a headliner of the vehicle. A duct connection port is connectable to a headliner air duct to permit forced airflow through the housing to moderate the environment.

15 Claims, 3 Drawing Sheets

(51) Int. Cl.
*B60R 11/04* (2006.01)
*B60S 1/02* (2006.01)
*B60R 11/00* (2006.01)
*G03B 17/55* (2021.01)

(52) U.S. Cl.
CPC ............... *B60R 2011/0026* (2013.01); *B60R 2011/0028* (2013.01); *G03B 17/55* (2013.01)

(58) Field of Classification Search
CPC ..... B60R 2011/0028; B60H 1/00; B60Q 1/00; B60J 1/002; B60S 1/026; G03B 17/55
USPC .................... 352/132; 454/75; 359/512, 838; 348/148
See application file for complete search history.

(56) References Cited

U.S. PATENT DOCUMENTS

| | | | | |
|---|---|---|---|---|
| 5,096,287 | A * | 3/1992 | Kakinami | B60R 1/12 352/132 |
| 5,923,027 | A * | 7/1999 | Stam | B60S 1/0885 250/208.1 |
| 6,020,704 | A * | 2/2000 | Buschur | B60S 1/0822 15/250.12 |
| 6,087,953 | A * | 7/2000 | DeLine | B60K 35/00 340/815.4 |
| 6,097,024 | A * | 8/2000 | Stam | B60S 1/0822 250/208.1 |
| 6,222,460 | B1 * | 4/2001 | DeLine | B60K 35/00 340/815.4 |
| 6,243,003 | B1 * | 6/2001 | DeLine | B60R 11/0247 381/86 |
| 6,313,454 | B1 * | 11/2001 | Bos | B60S 1/0844 250/208.1 |
| 6,326,613 | B1 * | 12/2001 | Heslin | B60S 1/0885 250/239 |
| 6,420,975 | B1 * | 7/2002 | DeLine | H04M 1/6075 340/815.4 |
| 6,433,676 | B2 * | 8/2002 | DeLine | B60R 1/12 340/425.5 |
| 6,555,804 | B1 * | 4/2003 | Blasing | B60S 1/0822 250/208.1 |
| 6,593,565 | B2 * | 7/2003 | Heslin | B60R 11/0241 250/239 |
| 6,650,233 | B2 * | 11/2003 | DeLine | B60R 1/12 340/425.5 |
| 6,806,452 | B2 * | 10/2004 | Bos | H04N 13/239 250/208.1 |
| 6,824,281 | B2 * | 11/2004 | Schofield | B60R 11/04 359/876 |
| 7,188,963 | B2 * | 3/2007 | Schofield | H04N 7/18 359/844 |
| 7,480,149 | B2 * | 1/2009 | DeWard | B60R 11/04 361/728 |
| 7,612,799 | B1 * | 11/2009 | Frank | H04N 5/33 250/330 |
| 8,339,453 | B2 * | 12/2012 | Blake, III | B60S 1/0888 348/148 |
| 9,244,165 | B1 * | 1/2016 | Lynam | G01S 13/931 |
| 2003/0169522 | A1 * | 9/2003 | Schofield | H04N 5/23238 359/876 |
| 2003/0214733 | A1 * | 11/2003 | Fujikawa | B60R 1/00 359/838 |
| 2004/0200948 | A1 * | 10/2004 | Bos | B60N 2/002 250/208.1 |
| 2005/0001901 | A1 * | 1/2005 | Eggers | B60R 11/04 348/118 |
| 2005/0213960 | A1 * | 9/2005 | Baldwin | G03B 17/02 396/439 |
| 2006/0270333 | A1 * | 11/2006 | Hirai | B60H 1/00785 454/75 |
| 2007/0216768 | A1 * | 9/2007 | Smith | B60J 1/02 348/118 |
| 2008/0265629 | A1 * | 10/2008 | Fry | B60R 13/0225 296/214 |
| 2009/0085755 | A1 * | 4/2009 | Schafer | B60R 11/04 340/602 |
| 2009/0315992 | A1 * | 12/2009 | Haug | B60R 11/0241 348/148 |
| 2010/0118145 | A1 * | 5/2010 | Betham | B60R 11/04 348/148 |
| 2012/0013741 | A1 * | 1/2012 | Blake, III | B60R 11/00 348/148 |
| 2012/0187171 | A1 * | 7/2012 | Rohrmuller | B60H 1/28 224/545 |
| 2012/0207461 | A1 * | 8/2012 | Okuda | B60R 11/04 396/419 |
| 2012/0233841 | A1 * | 9/2012 | Stein | G03B 17/02 29/428 |
| 2013/0222683 | A1 * | 8/2013 | Alm | H04N 5/2253 348/372 |
| 2014/0036079 | A1 * | 2/2014 | Lang | H04N 5/2252 348/148 |
| 2014/0049648 | A1 * | 2/2014 | Stein | B60Q 1/0023 348/148 |
| 2014/0055608 | A1 * | 2/2014 | Martin | G08B 13/19606 348/143 |
| 2014/0247390 | A1 * | 9/2014 | Ohsumi | B60R 11/04 348/373 |
| 2015/0146094 | A1 * | 5/2015 | Seger | G03B 17/55 348/374 |
| 2015/0256729 | A1 * | 9/2015 | Wato | H04N 5/2252 348/311 |
| 2016/0091714 | A1 * | 3/2016 | Hui | H04N 5/2251 359/512 |
| 2016/0119509 | A1 * | 4/2016 | Wato | H04N 5/2251 348/148 |
| 2016/0119514 | A1 * | 4/2016 | Sugimura | G03B 17/55 348/148 |
| 2016/0167595 | A1 * | 6/2016 | Kang | B60R 11/04 348/148 |
| 2016/0216595 | A1 * | 7/2016 | Carlson | G03B 17/561 |
| 2017/0064175 | A1 * | 3/2017 | Furutake | G06K 9/00798 |
| 2017/0184945 | A1 * | 6/2017 | Carlson | B60R 11/04 |
| 2018/0239223 | A1 * | 8/2018 | Blake, III | G03B 17/55 |

* cited by examiner

MODERATION OF A DRIVER ASSIST CAMERA ENVIRONMENT BY HEADLINER AIR DUCT

CROSS REFERENCES TO RELATED APPLICATION

The patent application hereby claims priority to U.S. Provisional Patent Application Ser. No. 62/010,695 filed Jun. 11, 2014 entitled MODERATION OF A DRIVER ASSIST CAMERA ENVIRONMENT BY HEADLINER AIR DUCT to Daniel D. Carlson. The above-identified application is incorporated herein by reference in its entirety for all purposes.

FIELD OF THE INVENTION

The present invention is directed to a system to moderate the environment of a driver assist ("DAS") camera mounted within a housing by use of a forced air headliner duct.

BACKGROUND

DAS cameras are incorporated in a vehicle platform to provide additional information to intelligent vehicle safety systems to aid the driver. The camera may be mounted near or on the vehicle windshield to ensure a maximum field of view. As a result, the camera may be exposed to direct sunlight for prolonged periods of time resulting in substantial heat build-up. The camera is also subject to extreme cold during winter and variable degrees of humidity.

SUMMARY OF THE INVENTION

A headliner duct from a heating, ventilation, and air conditioning ("HVAC") system provides cooling or warming airflow directly to the environment that surrounds a DAS camera.

In accordance with an example embodiment of the present invention, a system is provided for moderating the environment of a driver assist camera of a vehicle having a camera mounted within a housing adapted to be attached to a window and a headliner of the vehicle. A duct connection port is connectable to a headliner air duct to permit forced airflow through the housing to moderate the environment within.

DETAILED DESCRIPTION

The present invention provides a system for moderating the environment surrounding a DAS camera mounted within a housing. An HVAC duct in close proximity to the camera forces stagnant air to evacuate from a camera trim cavity and quickly replaces it with newly conditioned HVAC air upon vehicle startup. Conditioned HVAC air temperatures are more favorable for operation of the camera than extremely hot or cold stagnant air. The forced air from the HVAC system is capable of cooling an upper windscreen mounted camera more quickly than other cooling systems. For example, other cooling systems rely on convective heat transfer from the camera housing without the use of forced air. Such a system would result in delayed cooling that could prevent proper camera system operation or cause damage to the camera. For cameras mounted near the top of the vehicle interior, forced airflow may be further directed past the optical path of the camera lens. This air may be used to defog or defrost the windscreen glass, defog or defrost the lens, or clear dust from the optical path.

Figure 1:
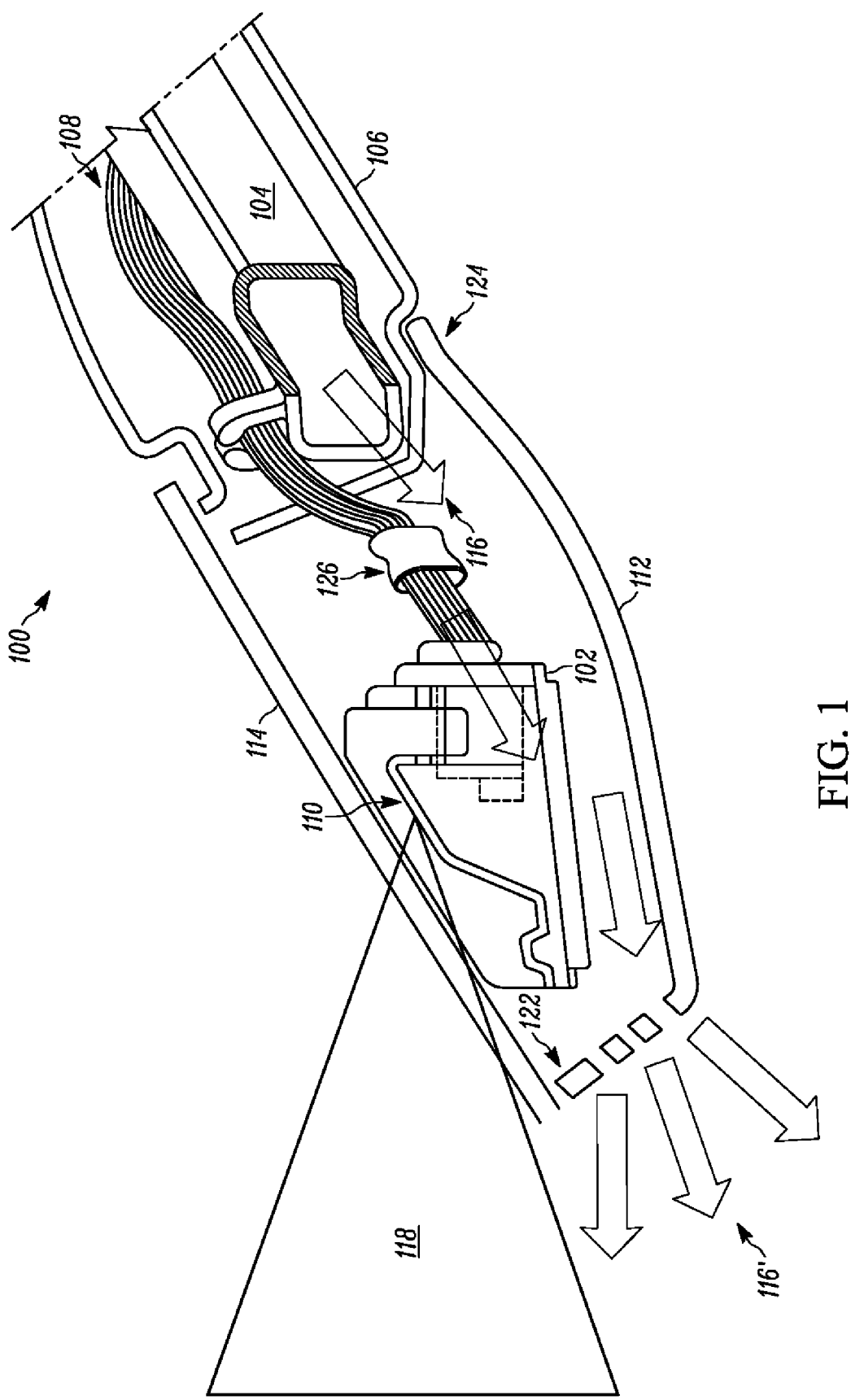
FIG. 1 is a diagram illustrating a system to moderate the temperature of a DAS camera in accordance with an example embodiment of the present invention.

FIG. 1 illustrates a system 100 for moderating the environment around a DAS camera located within a trim housing 112 in accordance with an example embodiment of the present invention. In the example of FIG. 1, the trim housing 112 is attached to the the vehicle headliner 106 by use of a trim-headliner connection port 124. The trim housing 112 encloses a camera housing 102, which contains the DAS camera and is configured to be attached to the vehicle by a mounting bracket 110. The camera housing 102 can be configured to further aid in moderating the temperature of the camera by being composed of a material suitable for heat transfer. For example, the camera housing 102 can be made of a highly heat conductive metal and could include heat sink fins extending into the path of airflow 116, resulting in a heat transfer device.

One or more control wires 108 are connected to the camera housing 102 and secured by one or more wire harnesses 126. In accordance with one example embodiment of the present invention, the control wires 108 can communicate with a vehicle electronic control unit ("ECU") programmed to execute a control process, including one or more commands. Those skilled in the art will appreciate that the control functions of the ECU could be accomplished by using discrete circuitry, a combination of different types of circuitry, or an application specific integrated circuit ("ASIC") and can be embodied in either the analog or digital domain.

The mounting bracket 110 can be secured to the vehicle, for example, by windshield 114 using any suitable method and/or component. For instance, an adhesive, a snap-fit connection, etc., may be used to secure the mounting bracket 110 to the vehicle. Moreover, the mounting bracket 110 may be attached to the trim housing 112 or may be independently secured to the vehicle.

An HVAC environmental control duct 104 can provide forced airflow 116 into the interior of the trim housing 112. The duct 104 can be run through the vehicle headliner 106 or another suitable channel from the vehicle HVAC system. As such, the duct 104 forces conditioned air 116 around and past the camera that corresponds to the desired air temperature of the cabin. For example, in response to a low ambient air temperature, heated air can be forced over the camera to defog or defrost the camera lens or inside surface of the windshield 114. In an environment with elevated ambient temperatures, cooled air can be supplied to lower the temperature of the DAS camera and associated components to ensure a proper operating condition. The flow of air 116 can additionally be directed to clear the components within the optical path of the field of view 118 such as dust and other debris that may accumulate between the camera lens and the windshield. As conditioned air 116 is forced into the trim housing 112, exhausted air 116' is forced out of the trim housing 112 through an exhaust port 122.

Airflow through the air duct 104 and, in turn, airflow around the camera can be controlled by the DAS camera system, such as the temperature and/or humidity camera sensor reaching a predetermined threshold value. Alternatively, airflow through the air duct 104 can be controlled commensurate with the control of the vehicle HVAC system. Alternatively, a duct connection port within the headliner air duct could be controlled, e.g., opened and closed, according to the sensed temperature and humidity of the air around the camera.

Figure 2:
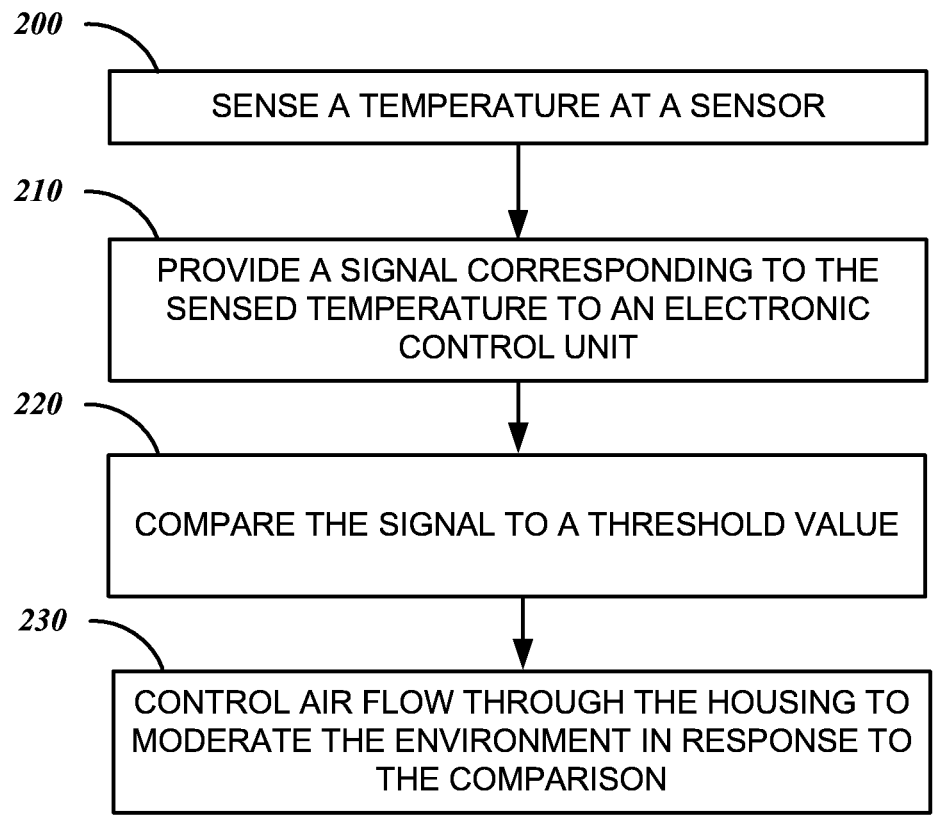
FIG. 2 is an illustration of a method in accordance with an example embodiment of the present invention.

FIG. 2 provides a method of moderating the environment of a driver assist camera of a vehicle by employing the systems described herein. In step 200, a temperature is sensed at a temperature sensor that is located within a housing attached to a window of the vehicle that houses the driver assist camera. In step 210, a signal corresponding to the sensed temperature is provided to an electronic control unit. In step 220, the signal is compared to a threshold value associated with the temperature sensor. For example, a threshold can be set at the high end of the acceptable operating range of temperature for the driver assist camera. Further, a second threshold can be set at a low end of the acceptable operating range. In step 230, a duct connection port connected to the housing can be activated to permit forced airflow through the housing to moderate the environment in response to the comparison of the sensed value and the threshold values.

Figure 3:
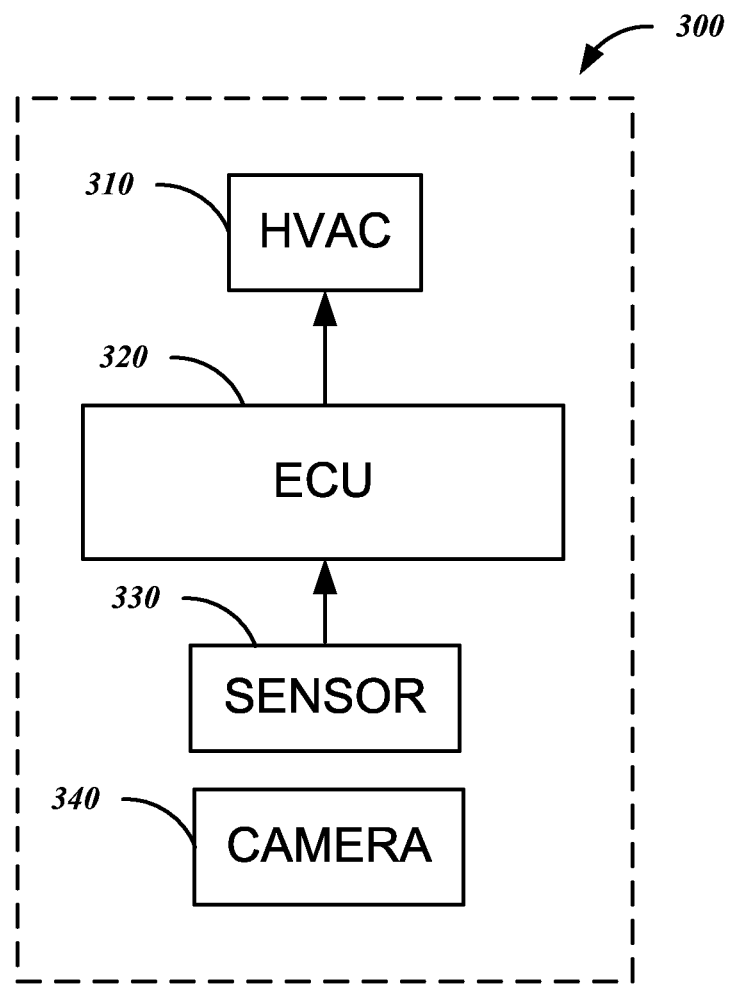
FIG. 3 is a diagram illustrating a system to moderate the temperature of a DAS camera in accordance with an example embodiment of the present invention.

FIG. 3 illustrates a system 300 for moderating the environment around a DAS camera 340 located in accordance with an example embodiment of the present invention. In the example of FIG. 3, the system 300 incorporates a sensor 330 in connection with an ECU 320, such as described herein. The ECU 320 processes signals from the senor to control an HVAC unit 310 to force airflow into the environment surrounding the camera 340.

From the above description of the invention, those skilled in the art will perceive improvements, changes and modifications. Such improvements, changes and modifications within the skill of the art are intended to be covered by the present invention.

Having described the invention, the following is claimed:

1. A system for moderating the environment of a driver assist camera of a vehicle comprising:
    a camera mounted within a housing, the housing adapted to be attached to a window and a headliner of the vehicle; and
    a connection port of the housing connectable to a headliner air duct so as to permit forced airflow through the housing from the connection port to an exhaust port of the housing so as to moderate the environment, the camera being disposed in the housing and in a path of the forced airflow between the connection port and the exhaust port such that the forced airflow flows around and past the camera.

2. The system of claim 1 wherein the headliner air duct is connected to a HVAC system of a vehicle.

3. The system of claim 1 wherein the exhaust port directs air flowing though the housing onto a windshield of the vehicle to aid in clearing the windshield.

4. A method of moderating the environment of a driver assist camera of a vehicle, the method comprising the steps of:
    sensing an interior temperature of a housing that is attached to a window of the vehicle;
    providing a signal corresponding to the sensed temperature to an electronic control unit;
    comparing the sensed temperature to a threshold; and
    controlling airflow through the housing to moderate the environment in response to the comparison by forcing airflow through the housing from a connection port to an exhaust port of the housing so that the camera is disposed in a path of the forced airflow between the connection port and the exhaust port such that the forced airflow flows around and past the camera.

5. The method of claim 4, further comprising the steps of:
    sensing a humidity at a humidity sensor located within the housing;
    comparing the sensed humidity to a threshold value; and
    controlling airflow through the housing in response to the comparison.

6. The system of claim 1 further comprising control wires for communication between the camera and a vehicle electronic control unit, the control wires extending through the connection port.

7. The system of claim 1, wherein the headliner encloses the headliner air duct.

8. The system of claim 1, wherein the camera is contained in a camera housing, the housing enclosing the camera housing, the camera housing being disposed in the housing and in the path of the forced airflow between the connection port and the exhaust port such that the forced airflow flows around and past the camera housing.

9. The system of claim 8, wherein the camera housing is attached to the vehicle by a mounting bracket.

10. The system of claim 1, wherein the camera housing is configured to promote heat transfer from the camera to the forced airflow.

11. The system of claim 10, wherein the camera housing is composed of a material suitable for heat transfer.

12. The system of claim 11, wherein the camera housing is made of a conductive metal.

13. The system of claim 10, wherein the camera housing includes fins extending into the forced airflow.

14. The system of claim 1, wherein the housing is one piece and separate from the camera.

15. The system of claim 1, wherein the camera is disposed in the path of the forced airflow between the connection port and the exhaust port such that the forced airflow flows around and past the entire camera.

* * * * *